United States Patent [19]

Langenbacher et al.

[11] Patent Number: 5,036,772
[45] Date of Patent: Aug. 6, 1991

[54] SUSPENSION CONVEYOR SYSTEM

[75] Inventors: Thomas Langenbacher; Rolf Schönenberger, both of Landsberg, Fed. Rep. of Germany

[73] Assignee: RSL Logistik GmbH & Co., Fed. Rep. of Germany

[21] Appl. No.: 353,281

[22] Filed: May 17, 1989

[30] Foreign Application Priority Data

Jun. 3, 1988 [DE] Fed. Rep. of Germany ....... 3819008

[51] Int. Cl.⁵ .......................... B61B 3/02; F01B 25/22
[52] U.S. Cl. ........................................ 104/91; 104/102
[58] Field of Search ................. 104/88, 89, 91, 96, 104/97, 100, 111, 253, 288, 264, 252, 172.4, 102; 105/148; 414/276

[56] References Cited

U.S. PATENT DOCUMENTS

| | | | |
|---|---|---|---|
| 3,088,419 | 5/1963 | Bishop | 104/172.4 |
| 3,247,806 | 4/1966 | Dehne | 104/172.4 |
| 3,690,269 | 9/1972 | Hempstead | 104/172.4 |
| 3,742,861 | 7/1973 | Wilkinson | 104/96 |
| 3,795,200 | 3/1974 | Pipes et al. | 104/96 |
| 3,889,606 | 6/1975 | Linton | 104/96 |
| 3,935,821 | 2/1976 | Maier et al. | 104/89 |
| 4,251,177 | 2/1981 | Neuhaeusser et al. | 414/276 |
| 4,542,698 | 9/1985 | Wakabayashi | 104/172.4 |
| 4,771,700 | 9/1988 | Wakabayashi | 104/172.4 |
| 4,856,270 | 8/1989 | Langen et al. | 104/91 |
| 4,915,566 | 4/1990 | Van Elten | 414/276 |
| 4,938,149 | 7/1990 | Lötzer | 104/102 |

FOREIGN PATENT DOCUMENTS

| | | |
|---|---|---|
| 367713 | 7/1982 | Austria . |
| 1229131 | 11/1966 | Fed. Rep. of Germany . |
| 2215252 | 10/1973 | Fed. Rep. of Germany . |
| 3130024 | 3/1983 | Fed. Rep. of Germany . |
| 3707295 | 6/1988 | Fed. Rep. of Germany ...... 104/100 |
| 2094770 | 9/1982 | United Kingdom . |

OTHER PUBLICATIONS

Brochure-Rollax-Systemtechnik AG, 1978.

Primary Examiner—Joseph F. Peters, Jr.
Assistant Examiner—Virna Lissi Mojica
Attorney, Agent, or Firm—Finnegan, Henderson, Farabow, Garrett & Dunner

[57] ABSTRACT

A suspension conveyor system for automatically conveying suspended conveyor carriages having a plurality of first rails disposed with their free ends in mutual transverse alignment along at least one transfer lane and at least one second rail disposed parallel with the transfer lane. A pallet travels on the second rail along the transfer lane and has at least one pallet rail, the path of travel of the pallet permitting a free end of the pallet rail to be selectively aligned with a free end of a first rail for the transfer of a conveyor carriage between the rails. A trolley is mounted for movement along the transfer lane independent of the pallet and control apparatus are provided for controlling movement of the trolley. A coupling device automatically couples and uncouples the trolley with the pallet to permit the trolley to travel together with the pallet or independently of it.

15 Claims, 7 Drawing Sheets

SUSPENSION CONVEYOR SYSTEM

BACKGROUND OF THE INVENTION

The invention relates to a suspension conveyor system.

Known suspension conveyor systems usually include supply storage or buffer zones in which a number of rail sections are mounted parallel to one another with their free ends aligned along a transfer lane. Manually displaceable along the transfer lane is a transfer trolley carrying rail sections also terminating in free ends. The transfer trolley can be positioned opposite the free end of a selected storage rail so that the free ends of the storage rail and of the rails carried by the transfer trolley are brought into linear alignment, permitting conveyor carriages to be transferred from the storage rails onto the transfer trolley and vice versa. However, the operation of a transfer trolley of this type is typically manual.

It is therefore an object of the present invention to provide an improved suspension conveyor system so as to permit its automated operation.

SUMMARY OF THE INVENTION

This object is attained according to the invention by providing a conveyor system for conveying suspended conveyor carriages comprising a plurality of first rails disposed with their free ends in mutual transverse alignment along at least one transfer lane, at least one second rail disposed parallel with said transfer lane, a pallet traveling on said second rail along said transfer lane and having at least one pallet rail, the path of travel of said pallet permitting a free end of the pallet rail to be selectively aligned with a free end of a first rail for the transfer of a conveyor carriage between said rails, a trolley mounted for movement along said transfer lane independent of said pallet, control means for controlling movement of said trolley and coupling means for automatically coupling and uncoupling said trolley to said pallet to permit said trolley to travel together with said pallet or independently of it.

The construction according to the invention provides what may be described as a shuttle-carrier for the pallet including drive and control mechanisms for the displacement of the pallet.

BRIEF DESCRIPTION OF THE DRAWINGS

An embodiment of the invention will now be described in detail by way of example with reference to the accompanying drawings, wherein.

DETAILED DESCRIPTION OF THE INVENTION

Figure 1:
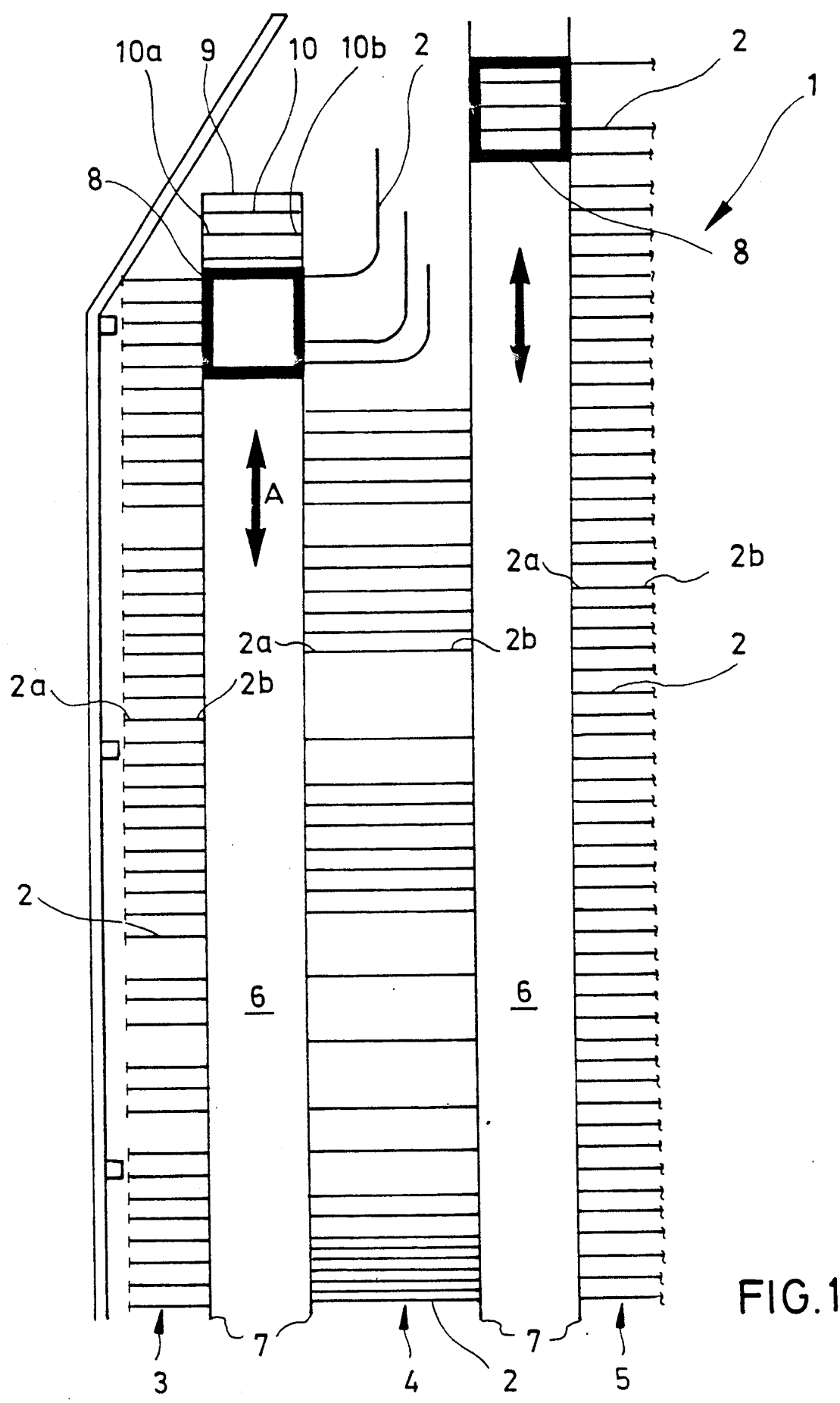
FIG. 1 shows a diagrammatic top plan view of a suspension conveyor system according to an embodiment of the invention.

Shown in FIG. 1 are parts of a suspension conveyor system 1 including a material supply storage zone or material buffer zone or the like, and a material conveying section leading to individual work stations or belonging to a department-spanning intraplant conveyor system. In the following, suspension conveyor system 1 shall be described in its form as a material supply storage system. The system comprises a plurality of first rails 2 used as storage rails and arranged in rows 3, 4, 5. The storage rails are formed as first rail sections 2 having two free ends 2a and 2b. In each row rails 2 are of equal length and disposed parallel to one another. The spacings between adjacent first rails 2 within any row and the length of the rails in the different rows are determined by the dimensions and the number of articles to be stored. The free ends 2a, 2b of first rails 2 in each row 3, 4 and 5 are aligned along an imaginary line extending perpendicular to rails 2. Rows 3 and 4 and 4 and 5, respectively, are disposed opposite one another so as to define a respective transfer lane 6 therebetween. A pair of parallel second rails 7 extends along each transfer lane 6. Each second rail 7 extends parallel to the imaginary line along which the free ends 2a, 2b of first rails 2 are aligned. The pairs of second rails 7 of the two transfer lanes 6 between rows 3 and 4 and 4 and 5, respectively, may be interconnected by a shift track section or by arcuate connecting rail sections. Second rails 7 support trolleys 8 for travelling thereon in the direction of double arrows A, two such trolleys being shown in the drawing. Depending on requirements, it is also possible to employ only a single trolley or a greater number of trolleys 8. Each trolley 8 is adapted to be coupled to a pallet 9 also travelling on second rails 7 in a plane below trolley 8. This coupled condition is shown in the transfer lane 6 between rows 4 and 5, while in transfer lane 6 between rows 3 and 4 trolley 8 is uncoupled from pallet 9. The number of pallets may also be varied as required, it being also possible to associate several pallets 9 to a single trolley 8. Each pallet 9 carries one or several pallet rails 10 having the same configuration as first or storage rails 2, likewise with two free ends 10a, 10b. Displacement of pallet 9 in the direction of double arrow A permits the free ends 10a, 10b of pallet rails 10 to be linearly aligned with the free ends 2a, 2b of respective first rails 2 on one or both sides of each transfer lane 6.

Figure 2:
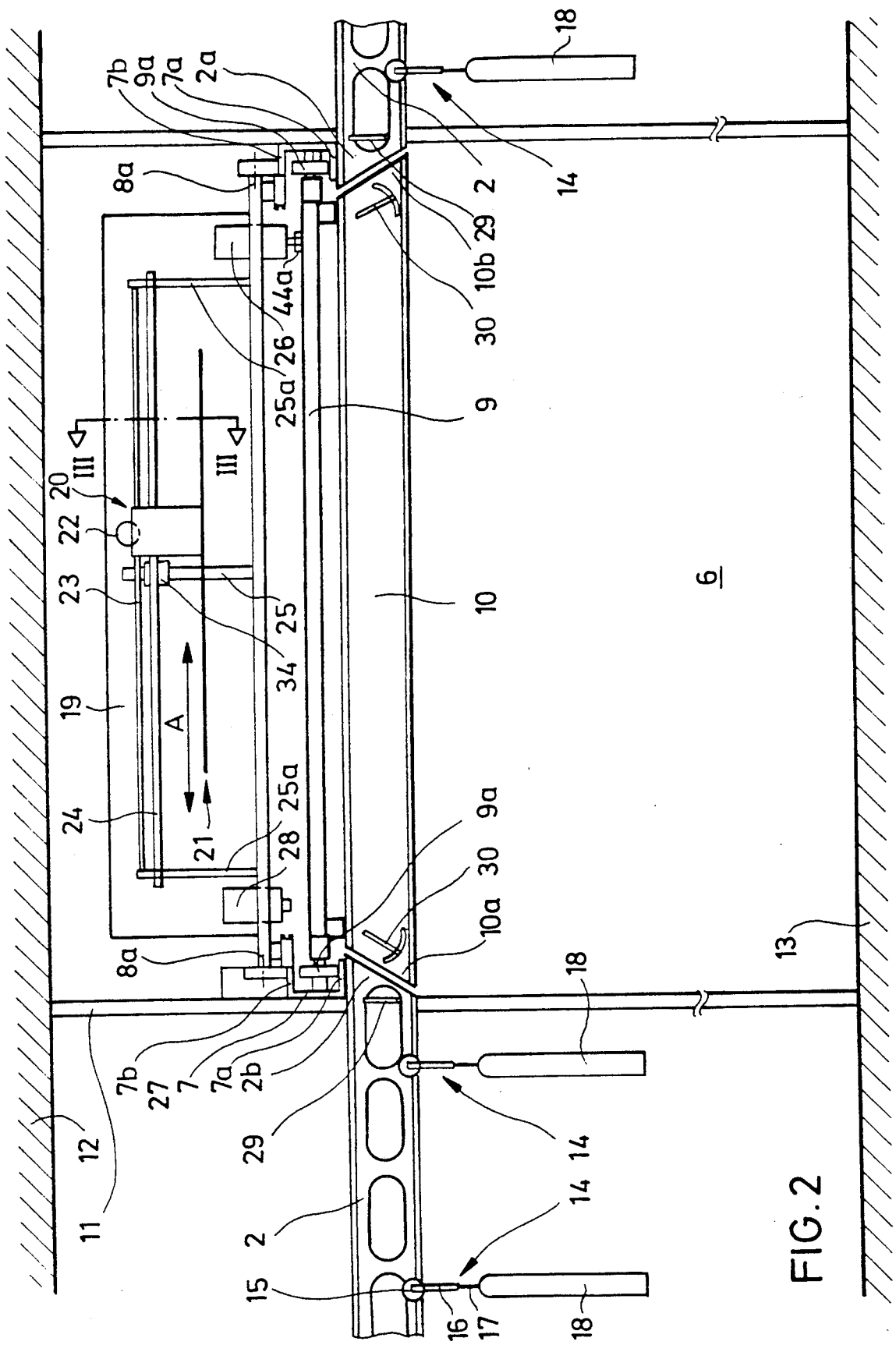
FIG. 2 shows a front view of parts of the suspension conveyor system of FIG. 1.

As shown in FIG. 2, first rails 2 and second rails 7 are mounted on support struts 11 between a ceiling 12 and a floor 13 of a plant enclosure. First rails 2 may for instance carry a known type of conveyor carriages 14 for travelling thereon. Each conveyor carriage 14 comprises a pair of casters 15 disposed at an angle relative to one another and interconnected by a stirrup hanger 16 from which an article 18 to be conveyed, for instance a piece of clothing, is suspended by means of a suspension link 17.

Figure 3:
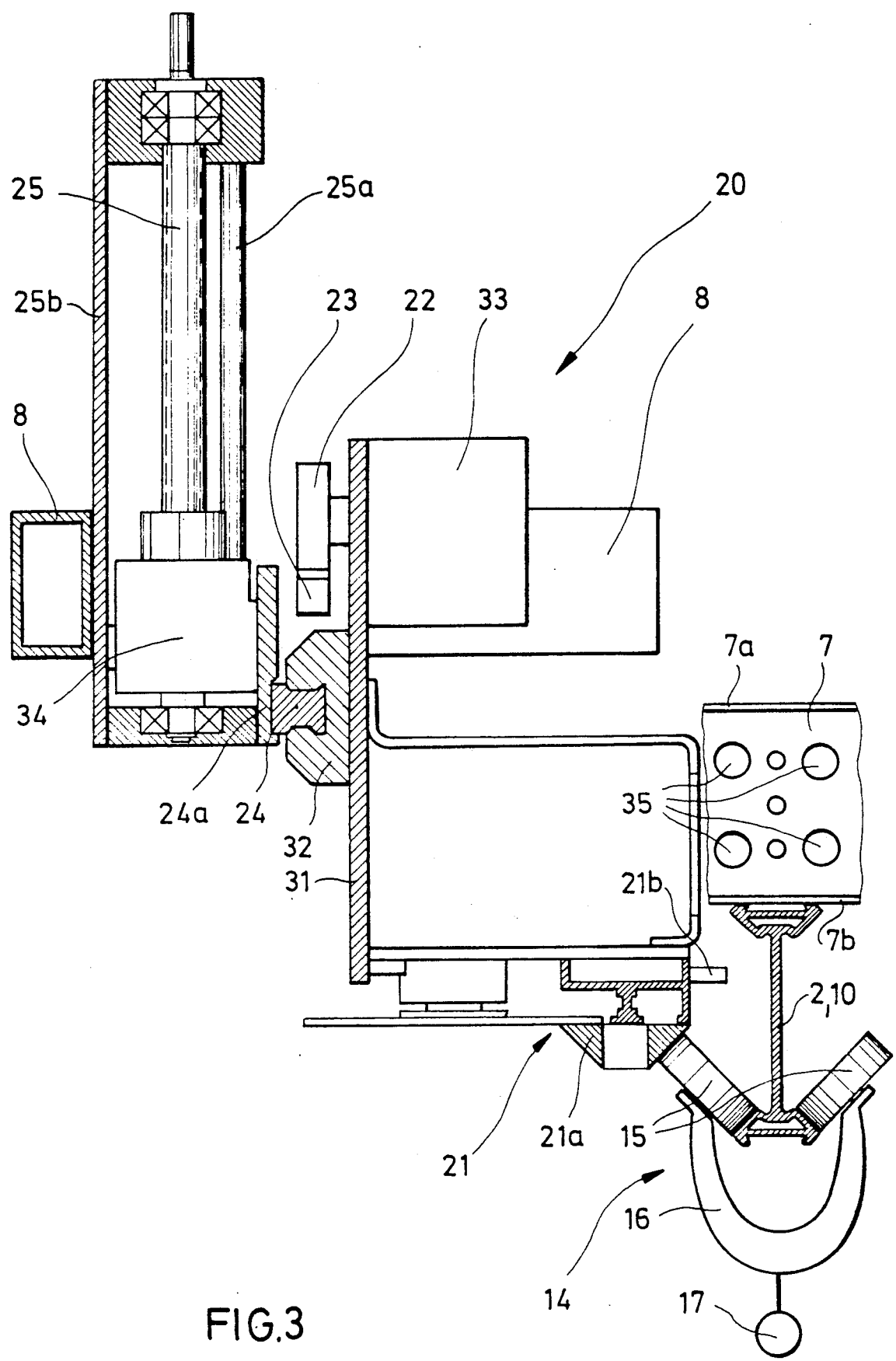
FIG. 3 shows an enlarged side view of a transfer mechanism.

For the accommodation of conveyor carriages 14 of this type, first rails 2 and pallet rails 10 are formed with the per se known cross-sectional shape shown in FIG. 3, comprising two tracks or runways disposed at right angles with respect to one another. Second rails 7 are of U-shaped cross-section and secured to support struts 11 above the free ends 2a, 2b of first rails 2 with their respective webs extending vertically and their open sides facing each other. The lower leg 7a of second rails 7 carries pallet 9 supported thereon for instance by respective caster combinations 9a consisting of a support caster and a guide caster projecting into the hollow profile of rail 7. A caster combination 9a of this type is preferably provided at each of the four corners of the rectangular frame construction of pallet 9. Pallet rails 10 are secured to the bottom side of pallet 9 in such a manner that at least one free end 10a or 10b of each rail 10 is linearly aligned with a free end 2a or 2b of a respective first rail 2 when pallet 9 is in a predetermined position, so as to permit a conveyor carriage 14 to be transferred from first rail 2 onto pallet rail 10 or vice versa.

The upper leg 7b of rails 7 carries a caster combination 8a of trolley 8 likewise formed of a support caster and a guide caster disposed at right angles with respect to one another. Trolley 8 also comprises a rectangular frame structure with a caster combination 8a provided at each of its four corners.

Trolley 8 carries a control unit 19 enclosed in a casing for protection from dust and moisture. Also mounted on trolley 8 is a motor (not shown) for the displacement of the trolleys. Trolley 8 further carries a transfer mechanism 20 including an endless drive belt 21 operable to revolve in a horizontal plane. Transfer mechanism 20 is provided with a gear 22 camming with a tooth rack 23 secured to trolley 8. Rack 23 extends across transfer lane 6 parallel to pallet rail 10 and first rails 2. Transfer mechanism 20 is horizontally displaceable on a guide rod 24 extending parallel to rack 23. A threaded spindle 25 is operable by a drive mechanism (not shown) for vertically lowering and raising trolley 8, guide rod 24 being guided by vertical rods 25a during this vertical movement. Additionally trolley 8 carries a coupling mechanism 26 to be described later in detail, and a locking mechanism 27 for trolley 8 as well as a locking mechanism 28 for pallet 9.

Each of the free ends 2a, 2b of first rails 2 and the free ends 10a, 10b of pallet rails 10 is provided with a stop device 29 or 30, respectively.

The transfer mechanism 20 shall now be explained in greater detail with reference to FIG. 3, this figure showing a cross-sectional view of the transfer mechanism with drive belt 21 extending perpendicular to the plane of the drawing. Drive belt 21 is formed of an endless carrier belt to which is secured a strip 21a of a friction material, preferably an expanded plastic material, having a substantially triangular cross-sectional shape and positioned so as to permit it to contact a respective caster 15 in the manner shown in the drawing, so that caster 15 is entrained by drive belt 21 as it revolves. Together with an associated drive mechanism (not shown), drive belt 21 is mounted on a frame member 31 also carrying a dovetail-shaped guide member 32. Guide member 32 is in positive engagement with guide rod 24 to maintain frame member 31 in a predetermined vertical position. Guide rod 24 is secured to a plate member 24a together with rack 23. Frame member 31 also carries an actuating pin 21b operable to open or release stop devices 29 and 30 in a manner to be described.

Also mounted on frame member 31 is a motor 33 for rotating gear 22. Rotation of gear 22 by motor 33 results in right- or leftward displacement so indicated by arrow A in FIG. 2 of frame member 31 together with drive belt 21 and actuating pin 21b to a position in which at least part of drive belt 21 as well as actuating pin 21b are located in the vicinity of a respective first rail 2.

Secured to plate member 24a is a spindle nut 34 mounted on threaded spindle 25, so that rotation of spindle 25 results in vertical displacement of plate member 24a together with guide rod 24 and frame member 31. To ensure continuous proper alignment, plate member 24a is provided with bearing blocks including linear ball bearings guided on vertical rods 25a. Together with the bearings of threaded spindle 25, vertical rods 25a are mounted on a base plate 25b secured to the frame of trolley 8.

Rotation of threaded spindle 25 in a desired direction thus results in upward or downward displacement of spindle nut 34 together with guide rod 24 and frame member 31 carrying drive belt 21.

As additionally shown in FIG. 3, the web of second rail 7 is formed with a plurality of openings 35 aligned at regular spacings along a horizontal row, the purpose of these openings being explained in detail as the description proceeds.

Figure 4:
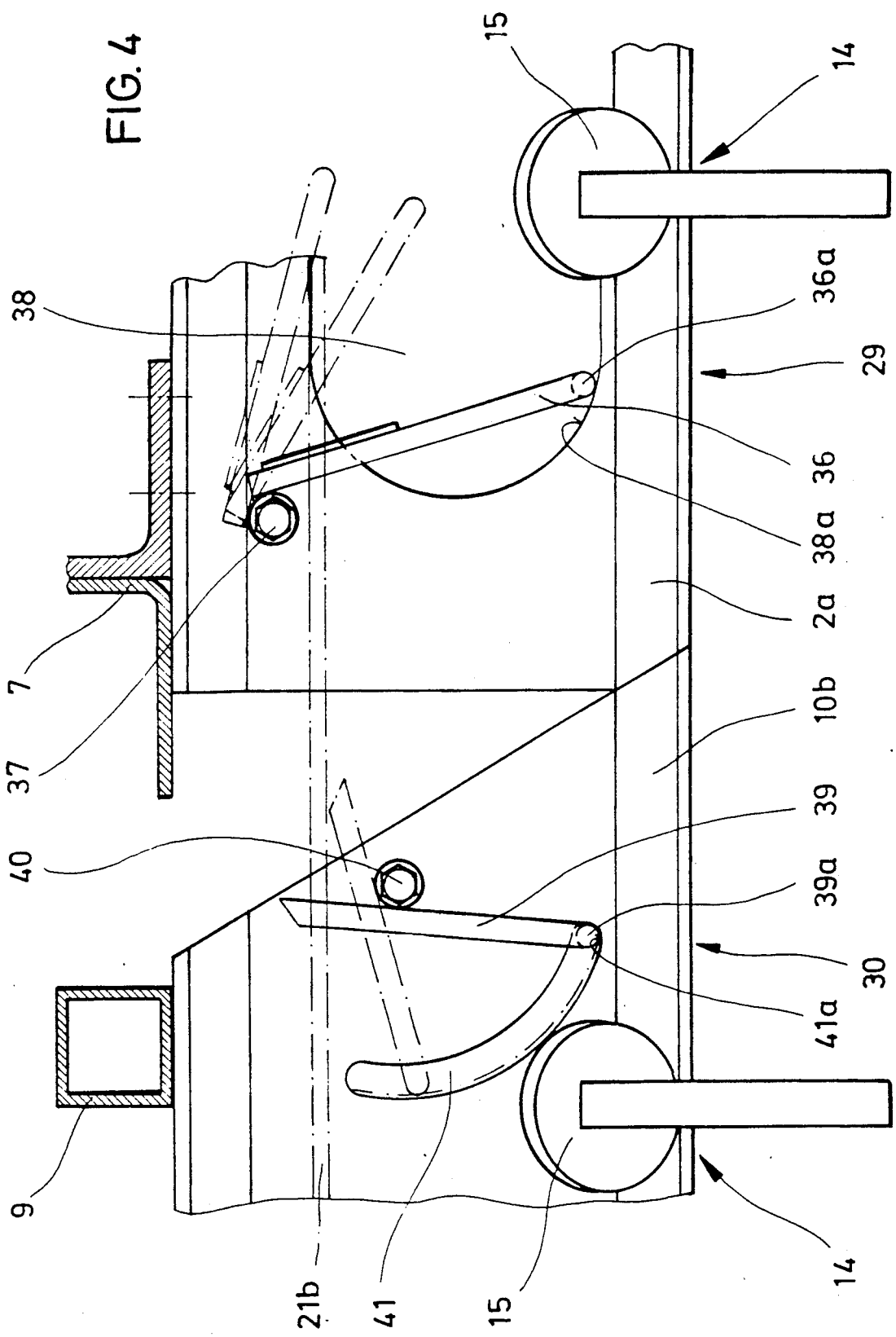
FIG. 4 shows an enlarged illustration of a stop device.

FIG. 4 is an enlarged illustration of the two stop devices 29 and 30. Stop device 29 is disposed on free end 2a of first rail 2 and comprises a lever 36 having a bent end portion 36a projecting into the path of the casters 15 of a conveyor carriage 14. At its end opposite its bent end portion 36a, lever 36 is pivotally mounted on a bolt 37 fixedly secured to free end 2a of first rail 2. Bent end portion 36a projects into an opening conventionally formed in first rail 2 for reducing its weight, so that an edge 38a of opening 38 can act as a stop for lever 36. This stop edge 38a is to the side of a vertical plane passing through bolt 37 facing away from free end 2a. In this manner it is only possible to pivot lever 36 away from the free end 2a of rail 2. Lever 36 is biased into engagement with stop edge 38a by the action of gravity to assume a position in which its bent end portion 36a projects into the path of casters 15.

Stop device 30 of pallet rail 10 is of similar construction and again comprises a lever 39 having a bent end portion 39a and mounted for pivoting about a bolt 40. Bent end portion 39a may again be received in an opening formed for weight-reduction purposes, or in an accurate guide slot 41 as shown in the drawing. Analogous to stop edge 38a, at least a lower end portion 41a of accurate slot 41 is formed as a stop for bent end portion 39a of lever 39. Lever 39 is mounted on bolt 40 in such a manner that its end portion opposite bent end portion 39a projects for a certain length above bolt 40. Lever 39 is likewise biased into engagement with stop portion 41a by the action of gravity.

Thus when a conveyor carriage 14 travels on first rail 2 towards free end 2a, or when another conveyor carriage 14 travels on pallet rail 10 towards free end 10b, their respective casters 15 will come into engagement with the bent end portion 36a or 39a of the respective lever 36 or 39 to bias the respective lever even more firmly into engagement with the associated stop portion 38a or 41a. In this manner the respective conveyor carriage 14 is prevented from inadvertently leaving the respective rail.

Shown by dash-dotted lines is the path of actuating pin 21b during its displacement in the direction of rack 23. During its travel along this path actuating pin 21b comes into contact with the end portion of lever 39 projecting above mounting bolt 40 and also with lever 36 at a location below its mounting bolt 37. As a result, both levers 39 and 36 are lifted off their respective stop portions 41a and 38a to permit passage of caster 15. The free ends 10b and 2a of pallet rail 10 and first rail 2, respectively, are cut off at a complementary angle of about 60°, so that a sufficiently smooth transition for the passage of the casters is ensured even when the rails are slightly offset relative to one another in the vertical and/or horizontal direction. The described chamfer as well as the stop devices are provided on the free ends of all pallet rails and first rails.

Figure 5:
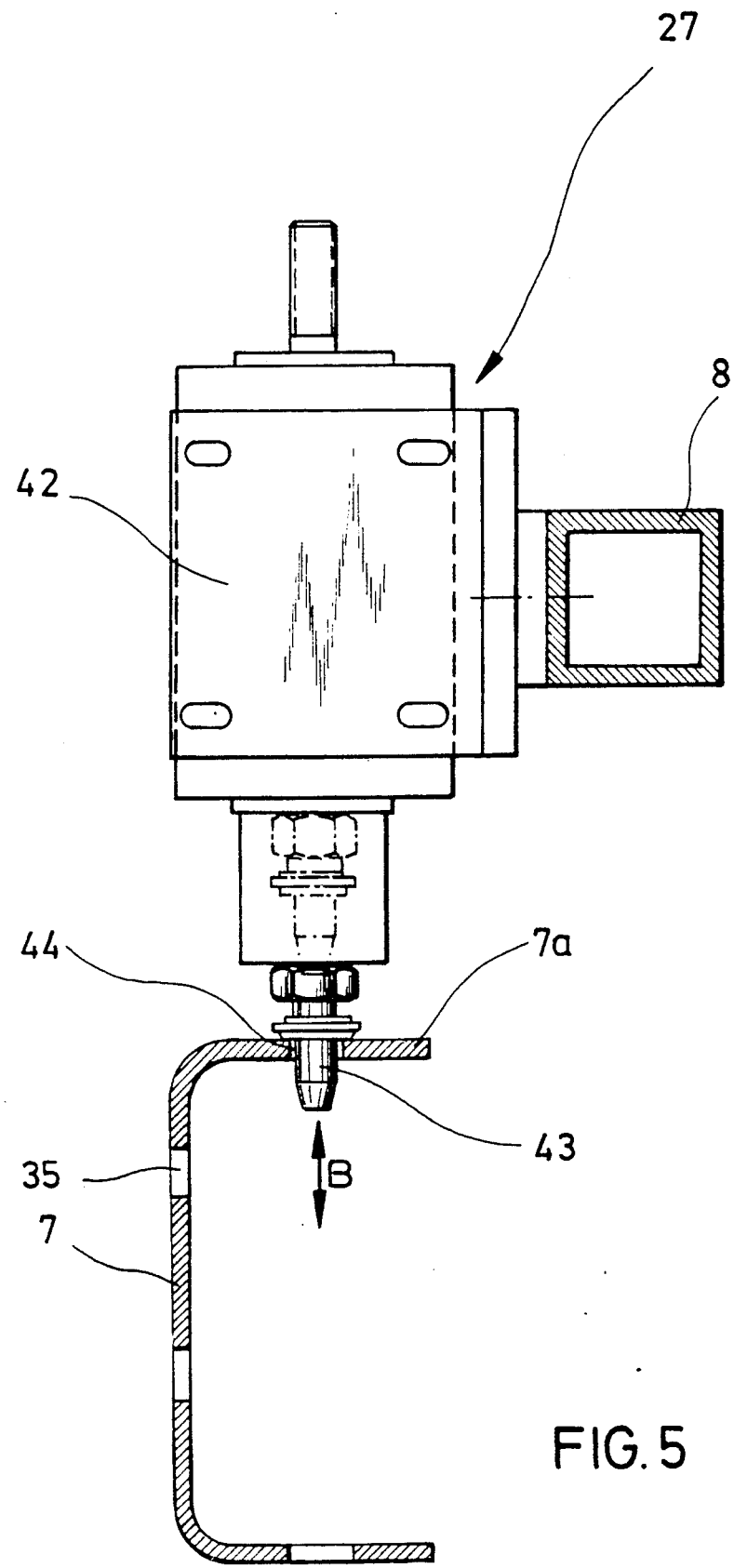
FIG. 5 shows a trolley locking mechanism.

FIG. 5 shows the locking mechanism 27 for locking trolley 8 on rail 7. Locking mechanism 27 comprises a lifting solenoid 42 fixedly mounted on trolley 8. Lifting solenoid 42 is operable to move a locking pin 43 back and forth in the direction of arrow B between the positions depicted in solid lines and phantom lines, respectively. In this manner locking pin 43 is inserted into, and retracted from, openings 44 formed in upper leg 7a of the channel section of rail 7. Openings 44 are similar to openings 35 and arranged at spaced locations in a row extending along leg 7a, the locations of individual openings 44 being selected so as to ensure correct positioning of trolley 8 with respect to the free ends 2a or 2b of adjacent first rails 2.

Coupling mechanism 26 is similarly operable for coupling trolley 8 to pallet 9. Coupling mechanism 26 likewise includes a lifting solenoid 42 for lifting and lowering a pin 43. Pin 43 is not engaged, however, with an opening in rail 7, but with a similar opening formed in a coupling member 44a of pallet 9 (FIG. 2).

Figure 6:
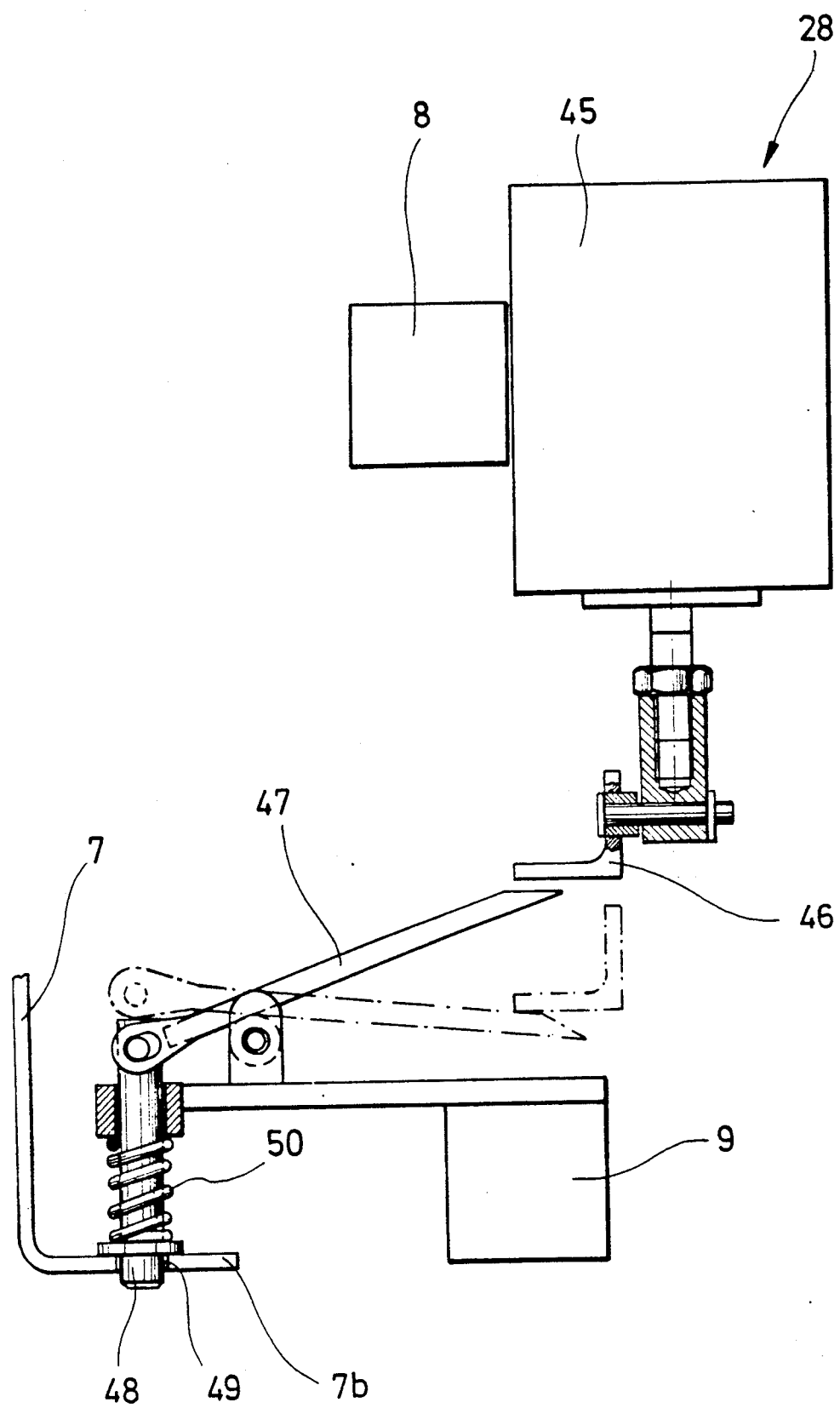
FIG. 6 shows a pallet locking mechanism.

Depicted in FIG. 6 is a locking mechanism 28 for pallet 9. Locking mechanism 28 again comprises a lifting solenoid 45 secured to trolley 8 and operable to raise and lower an actuator bar 46, preferably extending over the full length of trolley 8 parallel to rail 7 so a to permit pallet 9 to be unlocked in any position of trolley 8 relative to pallet 9.

Mounted on pallet 9 is a two-armed lever 47, one end of which is engageable by actuator bar 46 when the latter is lowered and trolley 8 is in a position above pallet 9. The other end of lever 47 carries a pin 48 adapted to be inserted into openings 49 in the lower leg 7b of rail 7.

Similar to openings 44 in upper leg 7a, openings 49 are arranged in a row at spaced locations permitting a pallet rail 10 of pallet 9 to be aligned with any selected first rail 2.

Pin 48 is biased into engagement with openings 49 by a spring 50 and releasable from this engagement by the action of pivot lever 47.

Figure 7:
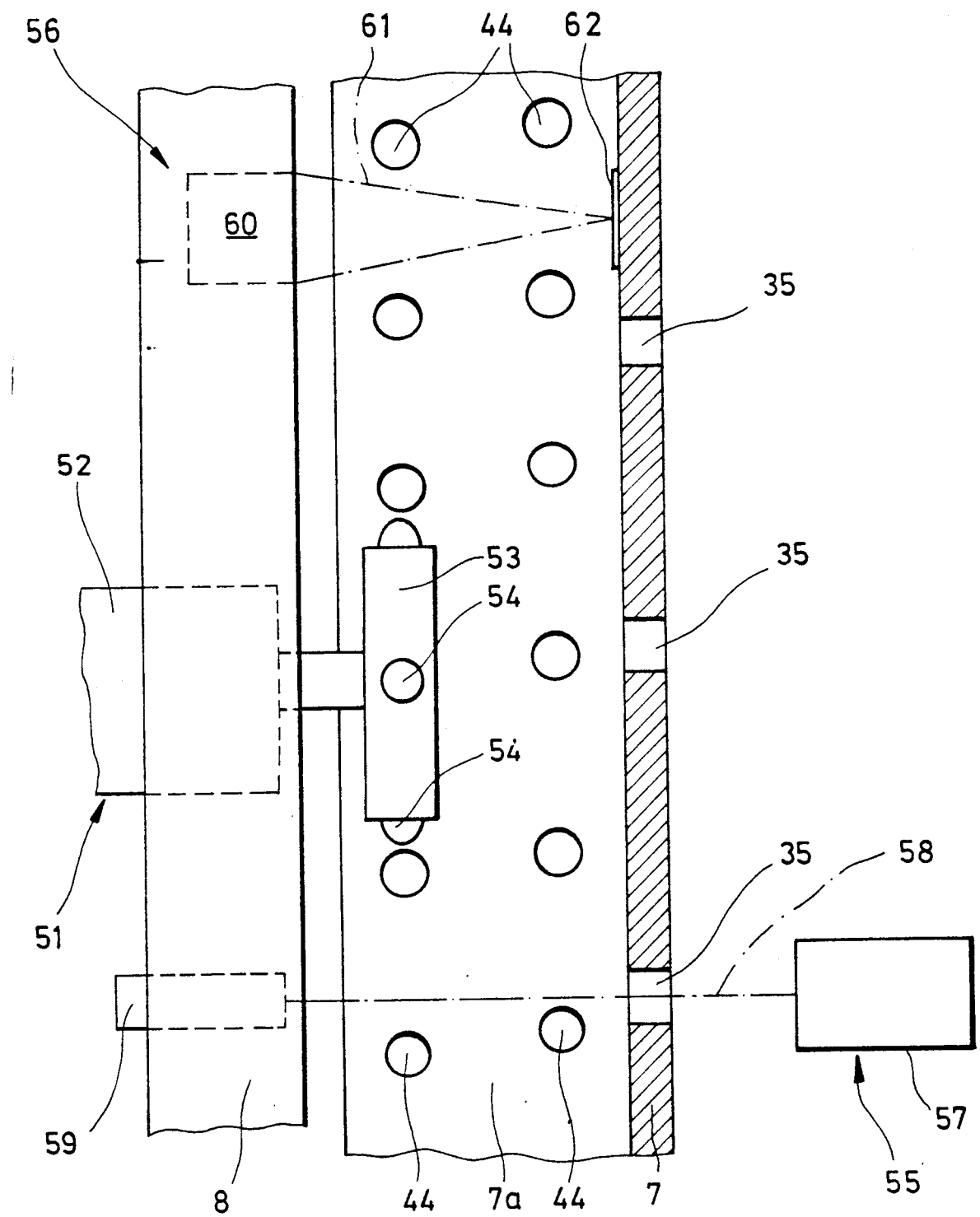
FIG. 7 shows a trolley positioning mechanism.

Shown in FIG. 7 are positioning devices for trolley 8 which may be used separately or in combination. A first positioning device 51 comprises an incremental rotary converter 52 coupled to a pinion 53 rotatably mounted on the frame of trolley 8. Distributed along the circumferential surface of pinion 53 is a number of engagement members 54 the diameter and circumferential spacing of which correspond to the diameter and spacing, respectively, of the openings 44 in upper leg 7a of rail 7. When pinion 53, which may or may not be rotated by an associated drive mechanism, is caused to travel along the row of openings 44, its circumferentially spaced engagement members 54 are successively engaged with respective openings 44, resulting in stepwise rotation of incremental rotary converter 52 to thereby provide an indication designating the position of trolley 8 along rail 7. The number of openings corresponding to any position of trolley 8 may be stored in control unit 19. In a modified embodiment, pinion 53 may additionally be used as a drive-transmitting member for the movement of trolley 8.

FIG. 7 shows two further positioning devices 55 and 56 employing light sensitive elements for the positioning operation. Positioning device 55 comprises an emitter 57 disposed opposite the pat of trolley 8 beyond rail 7. The vertical web of U-shaped rail 7 is shown in cross-section for demonstrating that the light beam 58 of emitter 57 is directed through on of the openings 35 formed in the web of rail 7. A sensor 59 mounted on trolley 8 is connected to control unit 19. Sensor 59 and emitter 57 are suitably configured and arranged to permit the position of trolley 8 to be reliably identified. There may for instance be provided a plurality of emitters, the position of trolley 8 being then identified by counting respective signals generated by the sensor or sensors.

The other positioning device 56 employs an emitter and sensor unit 60 mounted on trolley 8 and connected to control unit 19. Emitter and sensor unit 60 emits a light or radiation beam 61 directed onto the vertical web of rail 7. Disposed on the vertical web of rail 7 at selected locations are patches 62 of a reflecting sheet material acting to reflect beam 61 back to the emitter and sensor unit. The reflected beam is thus detected and used for the positioning operation. Positioning device 56 is particularly useful for the final alignment operation after trolley 8 has been moved to the vicinity of the desired position under the control of other positioning devices. To ensure this final alignment, respective patches 62 of the reflecting sheet material may be secured to the free ends 2a, 2b of first rails 2, in which case beam 61 may be directed through selected openings 35.

Rail 7 is preferably made of commercially available perforate profile members provided with punched holes in its legs and web during manufacture, or a punched sheet metal strip in connection with an imperforate profile member. The punched holes may then perform the function of the openings 35, 44 and 49, these functions being also interchangeable if so desired. Openings 44 and/or 49 may thus be used for positioning, and openings 35 for the locking function.

The electric power supply to the various drive mechanisms e.g. for the gear and rack combination, the drive belt, the threaded spindle and for the displacement of the trolley as well as to the various lifting solenoids may be accomplished by means of a bus bar (not shown) secured to support struts 11 and a collector brush mounted on trolley 8, the construction of a suitable bus bar and collector brush being generally known. The signals to be applied to control unit 19 may likewise be transmitted through similar bus bar and collector brush combinations.

The suspension conveyor system according to the invention operates as follows:

When it is for instance intended to transfer articles 18 from a first rail 2 of row 5 to another first rail 2 in row 4 (FIG. 1), the transfer operation is initiated by moving trolley 8 over a pallet 9 and coupling it thereto by operating coupling mechanism 26. Trolley 8 is then moved to a position opposite the selected first rail 2 in row 5, so that a free end 10b of one of the pallet rails 10 is linearly aligned with the free end 2a of the selected first rail 2. Trolley 8 and pallet 9 are then locked in this position by lowering pin 43 into opening 44 and engaging pin 48 with opening 49 of rail 7 by the operation of lever 47, respectively. Threaded spindle 25 is operated to lower drive belt 21, and gear 22 is rotated to displace driver belt 21 rightwards in FIG. 1 by its engagement with rack 23. This displacement is continued until stop devices 30 and 29 are opened and friction strip 21a of drive belt 21 is positioned above a caster 15 of the conveyor carriage, or carriages, to be transferred. In this position drive belt 21 may be lowered somewhat further to ensure effective frictional contact between friction strip 21a and caster 15. The drive mechanism of drive belt 21 is then activated, as a result of which the selected conveyor carriages are entrained by the friction strip 21a. At the same time transfer mechanism 20 may be returned to its position above pallet rail 10, this return movement being also effective to entrain the selected conveyor carriages. Levers 36 and 39 of stop devices 29 and 30 drop back to their stop positions, so that the free ends 2a and 10b, respectively, are again closed against the passage of conveyor carriages 14. After transfer mechanism 20 has subsequently been raised, lifting solenoids 42 and 45 are activated for retracting pins 43 and 48, respectively, from openings 44 and 49 of rail 7. The drive mechanism of trolley 8 may then be operated to move it to a position opposite a selected first rail 2 in row 4. Pins 43 and 48 are then again lowered after the pallet rail 10 carrying the articles to be transferred has been aligned with the selected first rail 2 in row 4. Transfer mechanism 20 is then lowered into contact with casters 15 and extended to a position over the selected first rail 2, resulting in stop devices 29 and 30 being simultaneously opened. The simultaneous operation of drive belt 21 causes the conveyor carriages 14 to be transferred to a first rail 2 in row 4.

When a pallet 9 is to be used for the temporary storage of articles 18, the conveyor carriages carrying the respective articles are transferred onto the pallet rails 10 in the manner described above. Trolley 8 then conveys the loaded pallet 9 to a temporary storage location. Lifting solenoid 45 of locking mechanism 28 is then operated to raise actuator bar 46, so that pin 48 is engaged with a selected opening 49 in lower leg 7b of rail 7 by the action of spring 50 to thereby lock pallet 9 on rail 7. Coupling mechanism 26 is then operated to release the connection between trolleys 8 and pallet 9, whereupon trolley 8 may be moved over another pallet 9 and coupled thereto.

In modifications of the embodiment described and illustrated by way of example, the suspension conveyor system according to the invention may also be used for rails and conveyor carriages of different construction. Each pallet may selectively carry one or several of the described rectilinear pallet rails, or of other transfer rails of prior-art construction. The trolleys according to the invention may also be used for handling individual conveyor carriages or for conveying any suitable number of conveyor carriages or transfer pellets connected to one another by a suitable linkage to form a transfer unit. The trolleys and pallets may be designed to travel on separate rails or on a common rail of different construction, for instance with an inner track for the casters of the pallets and an outer track for the trolley casters. The vertical and lateral displacements of the transfer mechanism may also be controlled by fluid-operated cylinders or the like.

We claim:

1. A conveyor system for conveying suspended conveyor carriages comprising a plurality of first rails disposed with their free ends in mutual transverse alignment along at least one transfer lane, at least one second rail disposed parallel with said transfer lane, a pallet travelling on said second rail along said transfer lane and having at least one pallet rail, the path of travel of said pallet permitting a free end of the pallet rail to be selectively aligned with a free end of a first rail for the transfer of a conveyor carriage between said rails, a trolley mounted for movement along said transfer lane independent of said pallet, control means for controlling movement of said trolley and coupling means for automatically coupling and uncoupling said trolley to said pallet to permit said trolley to travel together with said pallet or independently of it.

2. The conveyor system of claim 1, wherein the control means is mounted on the trolley and comprises drive means for moving the trolley in either direction along said second rail and a control unit for controlling operation of the drive means.

3. The conveyor system of claim 1, including transfer means mounted on the trolley for transferring a conveyor carriage between one of said first rails and the pallet rail.

4. The conveyor system of claim 3, wherein said transfer means comprises a transfer mechanism mounted on said trolley for movement in a direction perpendicular to the trolley's path of travel to locations adjacent said first rails for engagement with a conveyor carriage to transfer said carriage between one of said first rails and the pallet rail.

5. The conveyor system of claim 1, including releasable stop means on the free ends of said first rails moveable between a released position and a holding position for holding conveyor carriages on said first rails.

6. The conveyor system of claim 5, wherein said stop means is moved to a released position as a carriage transfers from said pallet rail to a first rail and by said trolley as a carriage transfers from a first rail to the pallet rail.

7. The conveyor system of claim 5, including a transfer mechanism mounted on said trolley for movement in a direction perpendicular to the trolley's path of travel to locations adjacent said first rails for engagement with a carriage to transfer said carriage between one of said first rails and the pallet rail, said stop means being moved to a released position by said transfer mechanism as it moves to said location.

8. The conveyor system of claim 5, wherein said stop means comprise hinged levers adapted to drop to a holding position by gravity.

9. The conveyor system of claim 1, wherein said trolley and said pallet travel along said transfer lane on a common rail having two tracks.

10. The conveyor system of claim 9, wherein said common rail has a U-shaped cross-section comprising an upper leg and lower leg, the trolley running on said upper leg, and the pallet on said lower leg.

11. The conveyor system of claim 2, wherein said second rail has a plurality of spaced locking holes and said control means includes a releasable locking pin engageable with said holes for locking said trolley at a predetermined location along said transfer lane.

12. The conveyor system of claim 11, wherein said locking pin is moveable between an unlocked and a locked position with said locking holes by a solenoid.

13. The conveyor system of claim 2, wherein said second rail has a plurality of spaced openings operable with said control means for selectively positioning said trolley.

14. The conveyor system of claim 13, wherein said openings extend in a row along said second rail and said control means includes a driven pinion gear moveable along said row of openings connected to an incremental rotary converter to provide an indication of the location of the trolley along said lane.

15. The conveyor system of claim 13 wherein said openings extend in a row along said second rail and said control means includes an optical scanner whose beam is directed through said openings as the trolley moves along said second rail.

* * * * *